United States Patent Office 2,845,406
Patented July 29, 1958

---

2,845,406

PROCESS FOR THE REMOVAL OF NICKEL-KIESELGUHR CATALYSTS FROM HYDROGENATED BUTADIENE POLYMERS

Martin R. Cines and Ben B. Buchanan, Bartlesville, Okla., assignors to Phillips Petroleum Company, a corporation of Delaware No Drawing. Application March 25, 1955
Serial No. 496,932

9 Claims. (Cl. 260—85.1)

This invention relates to the removal of the hydrogenation catalyst from a solution of a hydrogenated polymer of butadiene. In a further aspect, this invention relates to the removal of nickel-kieselguhr catalyst from a solution of hydrogenated polybutadiene dissolved in a solvent by a process comprising diluting said solution with an additional quantity of solvent, heating the resulting mixture and removing the catalyst from the heat-treated mixture by filtration or by centrifuging the mixture.

A copending application of Jones and Moberly, Serial No. 395,291, filed November 30, 1953, discloses a process for the production of thermoplastic materials prepared by hydrogenating rubbery polymers of butadiene. These materials are especially valuable for arctic service because of the fact that they are flexible at very low temperatures. Broadly, however, they are used to make fibers, filaments, dishes, containers, films, sheetings, toys, gaskets, tubing, coating materials, protective coverings, white sidewalls for tires, and many other materials.

The hydrogenated polymers are prepared by a catalytic hydrogenation procedure. In carrying out this process, a butadiene polymer, substantially free of salts or other materials which might act as hydrogenation catalyst poisons, is fed to a hydrogenation reactor in a form of a solution or dispersion in a suitable solvent. In some instances, the polymers dissolve completely, while in other cases a dispersion is formed and this appears to be a function of the particular polymer.

The polymers used in producing these new thermoplastic materials are selected from rubbery homopolymers of butadiene and copolymers of butadiene and styrene using not over 30 parts by weight of styrene per 100 parts by weight of monomers. These polymers are prepared by emulsion polymerization, the temperature for the polymerization ranging from −5° F. to 140° F., preferably from 20° F. to 60° F. Polymers of butadiene produced at 41° F. have produced hydrogenated materials with the best balance of properties. The polymer to be hydrogenated should have a Mooney viscosity below 40 (ML–4) measured at 212° F., although polymers of high Mooney viscosity can be used following milling or other degradation of the polymer prior to hydrogenation.

The catalyst used in this process is a nickel-kieselguhr catalyst having a particle size between 1 to 8 microns which has been activated at a temperature between 500 and 800° F. for a period of several hours by passing hydrogen thereover. Catalysts of larger particle size can be used but they are not as satisfactory. One catalyst, which is found to be quite suitable, is such a nickel-kieselguhr catalyst treated at 675° F. for 4 hours using approximately 100 volumes of hydrogen per volume of catalyst. Such treatment provides a reduced nickel content of approximately 40 percent. From 2 to 30 weight percent of the catalyst on the unreduced basis based upon the weight of the polymer gives a preferred rate of hydrogenation.

As stated above, many solvents can be used, but the ones which we have used to the greatest extent are the cycloparaffins containing 5 or 6 carbon atoms in the ring and their alkyl derivatives. Solvents such as cyclopentane, methylcyclopentane, cyclohexane, and methylcyclohexane are representative of these solvents. Mixtures of these solvents can also be used. Furthermore, it is not necessary to use the pure cycloparaffin, the commercial grades being satisfactory. For example, the commercial grade of cyclopentane has been found to contain cyclopentene as well as paraffins such as 2,2-dimethylbutane, normal pentane, and diisopropyl. Commercial methylcyclopentane actually contains about 55 to 75 percent of this material, the remainder being normal hexane, benzene, and cyclohexane. Isoheptanes, 2,4-dimethylpentane, and 1,1-dimethylcyclopentane are frequently present in commercial cyclohexane. Usually present in methylcyclohexane are toluene, normal heptane, and small amounts of cis-1,2-dimethylcyclopentane. After the polymer is dissolved in the solvent, the hydrogenation catalyst is added. The mixture is introduced into a reactor, hydrogen is added, and the temperature raised to a suitable level to initiate the reaction. This operation can be carried out in a batch-wise or a continuous process. Reaction pressures are preferably in the range of atmospheric to 3000 p. s. i. g., the usual range being within 100 to 1000 p. s. i. g. The temperature can range from 75° F. up to the degradation temperature of the polymer or the critical temperature of the solvent, maximum temperatures ranging as high as 575° F. The preferred range is between 300 and 525° F. Reaction times in the range of 1 to 24 hours, preferably 2 to 12 hours, are employed.

In order to obtain polymers of the desired characteristics, the unsaturation should be reduced to a value of approximately 0 to 50 percent, based upon the theoretical value of 100 percent for the unhydrogenated polymer. Preferably the hydrogenation is continued until the residual unsaturation is less than 30 percent.

One difficulty which has been encountered in carrying out this process is the removal of the catalyst from the reactor effluent. The initial polymer and the hydrogenated product both have a very high affinity for the solvent. Therefore, only dilute solutions can be used, solutions containing 3 to 15 percent polymer by weight being generally used. It is preferable to work with solutions containing approximately 5 weight-percent of the polymer. Even with these dilute solutions, the removal of the finely divided nickel-kieselguhr catalyst is extremely difficult. Some magnetic separators have been used but we are not aware of any which are suitable for large capacity operation. Also, certain mixtures have been obtained which are practically impossible to separate by ordinary methods of filtration or by high speed centrifuges.

For instance, one of these solutions was treated in a centrifuge which developed a force of 60,000 G where G equals the force of gravity. Complete removal of the catalyst could not be effected even when this force is applied.

The following are objects of this invention.

An object of this invention is to provide a process for the removal of finely divided nickel-kieselguhr from a solution of hydrogenated polybutadiene. A further object of this invention is to provide hydrogenated butadiene polymers free of catalyst.

Other objects and advantages of this invention will be apparent to one skilled in the art upon reading the accompanying disclosure.

We have discovered that a particular sequence of steps will permit removal of this finely divided catalyst from the polymer solution. Broadly, these steps comprise diluting the solution with an additional quantity of the solvent, heating the resulting mixture and then removing the catalyst from the heat-treated mixture. These steps of diluting and heating the mixture result in agglomeration of the catalyst particles. Following this agglomeration, the catalyst particles settle out of the solution and can be removed therefrom by conventional procedures. As set forth above, the solution to be hydrogenated should contain 3 to 15 percent polymer by weight, although solutions containing about 5 percent polymer are preferred. The amount of solvent added in the dilution step is preferably in an amount to give a 2:1 ratio based upon the volume of the material from the reactor containing the original amount of solvent, the polymer, and the catalyst. This is the optimum ratio although the ratio of additional solvent to reactor effluent can be in the range of 1:1 to 5:1. The temperature for the heating operation is from 100 to 575° F. although we prefer to operate in the range of 300 to 400° F. The heating is carried out under pressures up to 3000 p. s. i. g. to prevent loss of the solvent. The time can be broadly set forth as 10 minutes to 8 hours, although 30 minutes to 4 hours constitutes the preferred heating time. It will be apparent to one skilled in the art that there is a relationship between the original polymer concentration, the amount of additional solvent added, the temperature, and the time of treatment. With dilute solutions, less additional dilution is required. Likewise, as the amount of dilution increases, the severity of the heating, including both the temperature and length of time, can be lessened. Finally, heating at a high temperature for a short period of time appears to bring about the same result as heating at a low temperature for a long period of time. The preferred conditions set forth above are believed to provide the best balance of conditions for commercial operation.

It is usually preferable to add an additional quantity of the same solvent as that used for the hydrogenation process because the solvent recovered can then be recycled to the hydrogenation process. However, if desired, the additional solvent can be different from the solvent present during the hydrogenation.

The following examples set forth certain representative data from runs which have been made in the development of this invention and should be considered in that light rather than as limiting the invention to the conditions set forth therein.

*Example I*

A series of butadiene polymers were prepared by emulsion polymerization at 41° F. using the following recipe:

| | Parts by weight |
|---|---|
| Water | 180 |
| Butadiene | 100 |
| Santomerse No. 3 [1] | 1.5 |
| $K_4P_2O_7$ | 0.33 |
| $FeSO_4 \cdot 7H_2O$ | 0.28 |
| Diisopropylbenzene hydroperoxide | 0.214 |
| KOH | 0.03 |
| Tert-$C_{12}$ mercaptan | Variable |
| Shortstop: di-tert-butylhydroquinone (percent based on polymer) | 0.05 |
| Antioxidant: Polygard [2] (percent based on polymer) | 1.0 |

[1] Alkyl aryl sodium sulfonate.
[2] Tri(alkylaryl)phosphite.

The following tabulation shows the amount of polymer, amount of modifier, and the time conversion data for this series.

| Run | Modifier, parts/100 parts butadiene | Time, hours | Conversion, percent | Mooney ML-4 at 212° F. |
|---|---|---|---|---|
| 1 | 1.15 | 10.67 | 59.7 | 19 |
| 2 | 1.15 | 10.67 | 57.8 | 17 |
| 3 | 1.13 | 10 | 59.1 | 23 |
| 4 | 1.13 | 11.67 | 61.1 | 34 |
| 5 | 1.15 | 10 | 59.4 | 15 |
| 6 | 1.10 | 11.33 | 60.5 | 19 |

The products were combined to give 30 pounds of polymer having a Mooney (ML-4) of 21 at 212° F.

Using 45 gallons (295 pounds) of methylcyclohexane as a solvent, 15 pounds of this polybutadiene were dissolved and 3 pounds of a nickel-kieselguhr catalyst having a reduced nickel content of 43.9 percent were added. This mixture was introduced into a reactor and contacted with hydrogen for 3 hours therein, the reactor pressure being 505 p. s. i. g. and the temperature being 404° F. The residual unsaturation of the hydrogenated polymer was 14.3 percent following the hydrogenation. The particle size of the catalyst ranged from 1 to 15 microns. The viscosity of the reactor effluent was approximately 10 centipoises at 100° F. Because of the dispersed catalyst, the product was black in color and light could not be transmitted therethrough. The reactor effluent was heated to a temperature of 120° F. and fed to a centrifuge at a rate of 150 ml. per minute, this centrifuge operating at 21,000 R. P. M. The product obtained from this run was black in color and unsatisfactory for further use. The material was also centrifuged in a special laboratory centrifuge operating at a bowl speed of 50,000 R. P. M. (60,000 G) in an attempt to remove the catalyst solids therefrom. The material from this run had some of the catalyst removed but was still gray in color and unsatisfactory for use.

Therefore, centrifuging alone was not satisfactory for this particular material.

*Example II*

A polymer of butadiene was prepared by emulsion polymerization at 41° F. using the following recipe:

| | Parts by weight |
|---|---|
| Water | 180 |
| Butadiene | 100 |
| Potassium-OSR soap | 0.5 |
| Santomerse No. 3 [1] | 1.0 |
| KOH | 0.06 |
| $K_4P_2O_7$ | 0.165 |
| Methanol | 0.2 |
| Diisopropylbenzene hydroperoxide | 0.107 |
| Tert-$C_{12}$ mercaptan | 0.60 |
| Shortstop: di-tert-butylhydroquinone (percent based on polymer) | 0.15 |
| Antioxidant: Polygard [1] (percent based on polymer) | 1.0 |

[1] As in Example I.

A conversion of 57 percent was obtained in 18.5 hours, the resulting polymer having a Mooney viscosity of 16 (ML-4) at 212° F.

A 14.6 pound portion of this polymer was dispersed in 45 gallons of methylcyclohexane and 3 pounds of the finely divided nickel-kieselguhr catalyst, having a reduced nickel content of 35.9 percent, was added. A resulting mixture was heated in the presence of hydrogen at 403° F. at 500 p. s. i. g. for 3 hours. The resulting hydrogenated polymer had an unsaturation of 13.1 percent. Portions of the reactor effluent were treated with various materials and heated for varying lengths of time. The results of these treatments are shown in the following table:

| Catalyst Slurry, ml. | Additions to Slurry, ml. | Heat and Time | Time to Settle | Observations |
|---|---|---|---|---|
| 30 | Xylene, 30 ml. | 460° F. for 1 hour. | overnight | During heating, no change was observed. After overnight settling, about 1″ at top (11″ total) had settled out. |
| 15 | Xylene, 15 ml.; $H_2O$, 15 ml. | 400° F. for 2 hours. | | Developed a leak, but no apparent change occurred in slurry and no catalyst settled in water phase. |
| 15 | Methylcyclohexane, 30 ml. | 300° F. for 4 hours. | none required | At the end of 4 hours, the mixture cleared, the catalyst stuck to walls and settled. After cooling and shaking, the catalyst separated by settling in a short time. |
| 45 | $C_2H_5OH$, 5 ml. | 360° F. for 1 hour. | 2 hours | No settling was observed. |
| 25 | Methylcyclohexane, 25 ml. | 360° F. for 1 hour. | overnight | No settling had occurred after 2 hours. After overnight ¾″ was well settled and another 1¼″ partially settled. |
| 15 | Methylcyclohexane, 30 ml. | 385° F. for 2 hours. | 1½ hours | Solution partially cleared after 1½ hours of heating. The particles did not settle rapidly but coagulation could be seen, and after heating, light was transmitted through the solution. |

*Example III*

A 15 pound portion of the polybutadiene of Example II was dispersed in 45 gallons of methylcyclohexane and 2.25 pounds of finely divided nickel-kieselguhr catalyst were added. This mixture was treated with hydrogen for 3 hours at a temperature of 402° F. at a pressure of 501 p. s. i. g. A polymer having an unsaturation of 15.9 percent was produced.

An attempt was made to remove the catalyst from the reactor effluent with a centrifuge but separation was impossible. One part by volume of this solution was then diluted with 2 parts of methylcyclohexane. The resulting solution was heated to 350° F. in 3 hours and maintained at 350° F. for 1 hour. This treatment caused the catalyst particles to agglomerate and they could be removed in a centrifuge. When the catalyst was subjected to 8,000 G at a temperature of 120° F., 100 percent clarification was effected. Centrifuges of this type are commercially available.

The exact mechanism of our invention is not fully understood. Apparently, the addition of the additional solvent and the heating affects the solution in such a way that the particles of the catalyst lose their attraction for the solution and agglomerate. It is known that this is not simply an effect caused by diluting the solution since, without the heating step, the separation is not improved. Furthermore, it is not due to the viscosity reduction due to the higher temperature because the slurry can be cooled following the agglomeration of the catalyst particles and the catalyst can still be removed from the slurry as long as the temperature is maintained above that at which the polymer gels, i. e., above 85° F. and preferably above 100° F. However, this invention does solve a problem which has been a serious bottle neck in the production of the hydrogenated polymers.

As set forth in Example II, it is possible to observe the effect of the treatment by noting the settling of the catalyst particles. An additional method which we have used is to pass the material through a Jerguson gauge having two clear sight glasses and provided with a 15-watt fluorescent bulb behind the gauge. Before treatment, no light is transmitted through the ¾ inch light path of the gauge. As the treatment continues, a point is reached when light passes through the gauge and, at this point, the particles have been sufficiently agglomerated so that they will settle out on standing or will be removed by the use of a centrifuge.

While the examples set forth herein have been based upon the use of a centrifuge as the test apparatus, it is apparent that filtration can also be used following agglomeration of the catalyst particles. The centrifuge is used because it is capable of applying greater force for the separation process, this emphasizing the difficulty of the catalyst removal. Also, where the agglomeration is continued for a considerable period of time, separation by simply decanting the clear solution from the catalyst can be used.

As many possible embodiments may be made of this invention without departing from the scope thereof, it is to be understood that all matter herein set forth is to be interpreted as illustrative and not as unduly limiting the invention.

We claim:

1. In the process for production of hydrogenated material by hydrogenating polymeric material selected from the group consisting of rubbery homopolymers of butadiene and copolymers of butadiene containing not over 30 percent by weight of styrene wherein said polymeric material is dispersed in a cycloparaffinic hydrocarbon solvent and contacted with hydrogen in the presence of a finely divided nickel-kieselguhr catalyst in order to reduce the unsaturation of said polymeric material; the method of removing said catalyst comprising diluting the dispersion of said hydrogenated polymeric material, solvent, and catalyst, with an additional quantity of a cycloparaffinic hydrocarbon solvent, said additional cycloparaffinic solvent being added in an amount of 1:1 to 5:1 based on the volume of said dispersion; heating the resulting mixture at a temperature of 100 to 500° F. for 10 minutes to 8 hours, the time of said heating being sufficiently long to cause agglomeration of said catalyst; and removing said catalyst from the heat-treated mixture.

2. The process of claim 1 wherein said catalyst is removed by filtration.

3. The process of claim 1 wherein said catalyst is removed by centrifugation.

4. The process of claim 1 wherein said polymeric material is a homopolymer of butadiene.

5. In the process for the production of hydrogenated material by hydrogenating polymeric material selected from the group consisting of rubbery homopolymers of butadiene and copolymers of butadiene containing not over 30 percent by weight of styrene wherein said polymeric material is dispersed in methylcyclohexane and contacted with hydrogen in the presence of a finely divided nickel-kieselguhr catalyst in order to reduce the unsaturation of said polymeric material; the method of removing said catalyst comprising diluting the dispersion of said hydrogenated polymeric material, methylcyclohexane, and catalyst, with an additional quantity of methylcyclohexane, said additional methylcyclohexane being added in an amount of from 1:1 to 5:1 based on the volume of said dispersion; heating the resulting mixture at a temperature of 100 to 575° F. for 10 minutes to 8 hours, the time of said heating being sufficiently long to cause agglomeration of said catalyst, and removing said catalyst from the reaction mixture.

6. In the process for the production of hydrogenated material by hydrogenating polymeric material selected from the group consisting of rubbery homopolymers of butadiene and copolymers of butadiene containing not over 30 percent by weight of styrene wherein said polymeric material is dispersed in a cycloparaffinic hydrocarbon solvent, said solvent being used in an amount to give a solution containing 3 to 15 percent by weight of said polymeric material, and contacted with hydrogen in the presence of a finely divided nickel-kieselguhr catalyst in order to reduce the unsaturation of said polymeric material; the method of removing said catalyst comprising diluting the dispersion of said hydrogenated polymeric material, solvent, and catalyst with cycloparaffinic hydrocarbon solvent, said additional cycloparaffinic hydrocarbon solvent being added in an amount of from 1:1 to 5:1 based upon the volume of said dispersion; heating the resulting mixture at a temperature in the range of 100 to 575° F. for 10 minutes to 8 hours, said heating being sufficiently long to cause agglomeration of said catalyst; and removing said catalyst from the resulting mixture.

7. The process of claim 6 in which said heating is conducted at a temperature of 300 to 400° F. for 30 minutes to 4 hours.

8. In the process for the production of hydrogenated material by hydrogenating polymeric material selected from the group consisting of rubbery homopolymers of butadiene and copolymers of butadiene containing not over 30 percent by weight of styrene wherein said polymeric material is dispersed in methylcyclohexane, said methylcyclohexane being used in an amount to give a solution containing 3 to 15 percent by weight of said polymeric material, and contacted with hydrogen in the presence of a finely divided nickel-kieselguhr catalyst in order to reduce the unsaturation of said polymeric material; the method of removing said catalyst comprising diluting the dispersion of said hydrogenated polymeric material, methylcyclohexane, and catalyst with methylcyclohexane, said additional methylcyclohexane being added in an amount of from 1:1 to 5:1 based upon the volume of said dispersion; heating the resulting mixture at a temperature in the range of 100 to 575° F. for 10 minutes to 8 hours, said heating being sufficiently long to cause agglomeration of said catalyst; and removing said catalyst from the resulting mixture.

9. In the process for the production of hydrogenated material by hydrogenating polymeric material selected from the group consisting of rubbery homopolymers of butadiene and copolymers of butadiene containing not over 30 percent by weight of styrene wherein said polymeric material is dispersed in methylcyclohexane to give dispersion containing approximately 5 percent of said polymeric material on a weight basis, and contacted with hydrogen in the presence of a finely divided nickel-kieselguhr catalyst in order to reduce the unsaturation of said polymer; the method of removing said catalyst comprising diluting the dispersion of hydrogenated polymeric material, methylcyclohexane, and catalyst with additional methylcyclohexane, said additional methylcyclohexane being used in an amount to give a volume dilution ratio of approximately 2:1, heating the resulting mixture at approximately 300° F. for 4 hours; and removing said catalyst from the resulting mixture.

References Cited in the file of this patent
FOREIGN PATENTS 652,566  Great Britain _____ Apr. 25, 1951